United States Patent
Bohler

(10) Patent No.: US 6,637,307 B2
(45) Date of Patent: Oct. 28, 2003

(54) METHOD FOR MACHINING A WORKPIECE AND CHUCK WITH A CENTER PIN FOR IMPLEMENTING IT

(75) Inventor: Erwin Bohler, Bettwiesen (CH)

(73) Assignee: Forkardt Schweiz AG, Effretikon (CH)

( * ) Notice: Subject to any disclaimer, the term of this patent is extended or adjusted under 35 U.S.C. 154(b) by 0 days.

(21) Appl. No.: 09/951,787

(22) Filed: Sep. 13, 2001

(65) Prior Publication Data
US 2002/0038585 A1 Apr. 4, 2002

(30) Foreign Application Priority Data
Sep. 21, 2000 (EP) .............................. 00120616

(51) Int. Cl.⁷ .......................... B23B 31/00; B23B 5/22
(52) U.S. Cl. .......................................... 82/165; 82/170
(58) Field of Search .......................... 82/1.11, 162, 163, 82/164, 165, 166, 170, 173

(56) References Cited

U.S. PATENT DOCUMENTS

| | | | | |
|---|---|---|---|---|
| 4,125,042 A | * | 11/1978 | Barron | 82/165 |
| 4,604,923 A | * | 8/1986 | Link et al. | 82/1.11 |
| 4,677,885 A | * | 7/1987 | Schmid et al. | 82/165 |
| 5,025,689 A | * | 6/1991 | Mayer | 82/106 |
| 5,771,762 A | * | 6/1998 | Bissett | 82/1.11 |
| 6,374,713 B1 | * | 4/2002 | Bissett | 82/150 |

FOREIGN PATENT DOCUMENTS

| | | |
|---|---|---|
| CH | 662964 | 11/1987 |
| EP | 0 523 573 A1 | 1/1993 |
| JP | 57-89506 A | * 6/1982 |

\* cited by examiner

Primary Examiner—Henry W. H. Tsai
(74) Attorney, Agent, or Firm—Olson & Hierl, Ltd.

(57) ABSTRACT

In order to machine a workpiece on a machine-tool successively between centers and with the workpiece clamped in a chuck, the workpiece is held during at least one machining operation—and if necessary between different kinds of machining—through the axial pressure of a center pin clamped in a chuck of the machine-tool. To this end the chuck comprises an axial center pin hydraulically movable in axial direction, which can be extended for enough towards the workpiece to be gripped by the jaws of the chuck, and which is journalled in at least one expanded sleeve bearing.

12 Claims, 1 Drawing Sheet

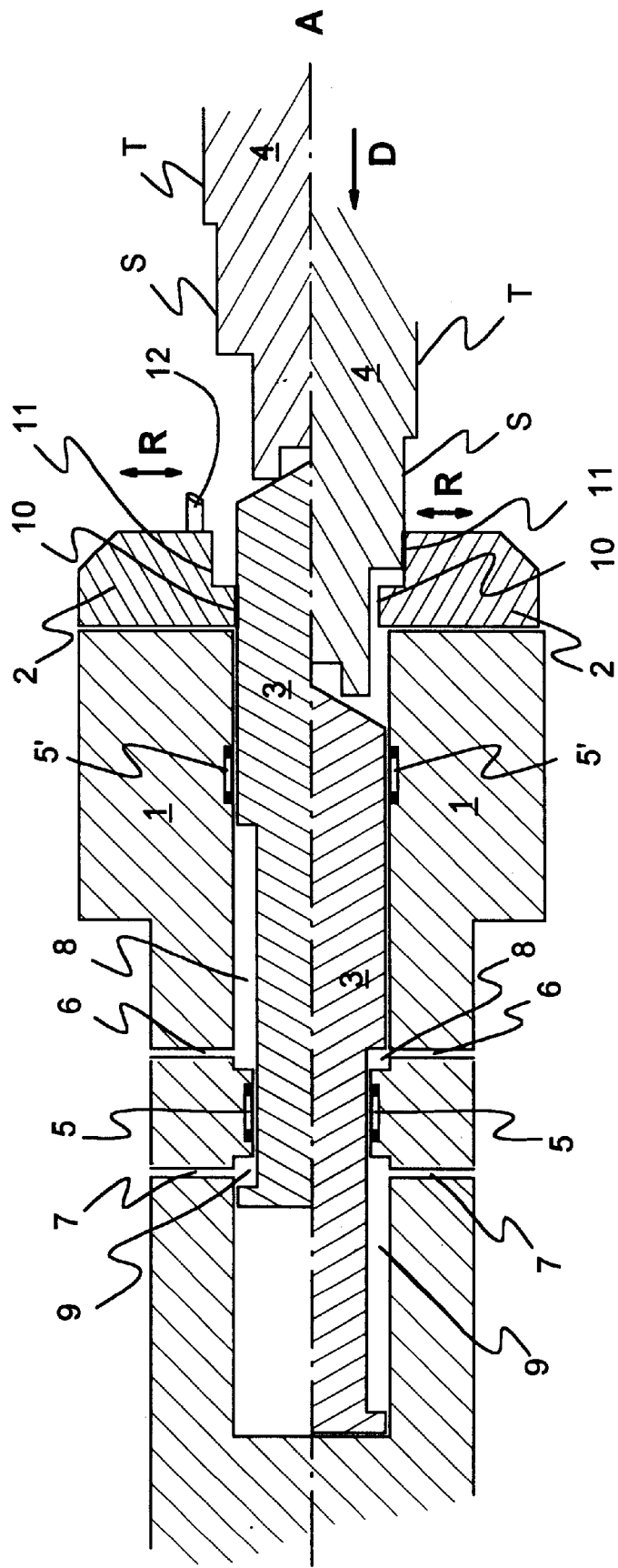

METHOD FOR MACHINING A WORKPIECE AND CHUCK WITH A CENTER PIN FOR IMPLEMENTING IT

CROSS REFERENCE TO RELATED APPLICATIONS

This application claims the priority of European patent application No. 00 120 616.8, filed Sep. 21, 2000, the disclosure of which is incorporated herein by reference in its entirety.

BACKGROUND OF THE INVENTION

When machining a workpiece such as for instance a crankshaft with very high precision it is sometimes desirable to perform this machining (turning, grinding etc.) in part between centers and in part with a workpiece that is clamped in the jaws of the chuck of a machine-tool. This is because in order to machine parts of the workpiece that are far away from its extremities and possibly eccentric, this workpiece must be firmly clamped at least at one of its extremities in the jaws of a chuck, which means that this machining cannot be done between centers. Now, in order to obtain a precise centering of the workpiece when it is clamped in the chuck its jaws must size a surface that has a previously been machined with a high precision with respect to a given rotation axis. It is, however, difficult, or even impossible, to perform the previous machining of this surface (which can for instance be the end bearing of a crankshaft) while corresponding extremity of the workpiece is clamped in a chuck, either because the surface to be machined would then be so near to the chuck that it could not be reached by tools, or because if said surface remains readily accessible there is no place near that end of the workpiece where the chuck could size it. Therefore, said end is often machined in a first, separate operation, between rotating center pins, which ensures a very precisely centered surface. This in turn guarantees that the workpiece will be precisely centered for later operations when it is seized by jaws that grip said previously machined surface, for example in order to perform an eccentric grinding of the workpiece.

In order to work on a workpiece that is sometimes maintained between a center pins and sometimes in the jaws of chuck of the machine-tool it is known to use a center pin co-axial with the chuck and displaceable along its rotation axis so that in its foremost position it can be gripped by the jaws of the chuck. However, because of the required precision and the necessity to move the pin longitudinally, it was hitherto not possible to journal it satisfactorily.

Hence, it is general object of the invention to support the pin in a way that allows one to move it axially when this is desired, but also to easily immobilize it in a position where it is centered with high degree of precision. In order to implement this and still further objects of the invention, which will become more readily apparent as the description proceeds, the invention is defined as recited in the claims.

BRIEF DESCRIPTION OF THE DRAWINGS

The invention will be better understood and objects other than those set forth above will become apparent when consideration is given to the following deetailed description thereof. Such description makes reference to the annexed drawings, wherein the single FIGURE shows as schematical embodiment of a preferred device for performing the method of the invention.

DETAILED DESCRIPTION OF THE INVENTION

While there is shown and described a presently preferred embodiment of the inventnion, it is to be distinctly understood that the invention is not limited thereto but may be otherwise variously embodied and practised within the scope of the following claims.

The FIGURE shows a schematical section through two static states of a chuck according to the invention intended for use in a machine tool. Cipher 1 identifies the body of the chuck, A its rotational axis and 2 a jaw of the chuck. A center pin 3 is a journalled in the chuck in away which allows its displacement parallely to the axis A. In the upper half of the FIGURE the center pin is shown in its forward position, and in the lower part of the FIGURE it is shown in its retracted position. Accordingly, in the upper section of the FIGURE a workpiece 4 located on the right hand side is supported and centered through a center pin 3 at its extremity facing the chuck, whilst in the lower part of the FIGURE it is clamped in the collet of the chuck (of which only jaw 2 is visible in the drawing). The workpiece is then not supported by the center pin anymore, although it may still touch it.

The upper half of the FIGURE shows the machining step usually performed first, when a surface S situated near one end of the workpiece 4 is being machined (for instance ground). To perform this operation the center pin 3 is moved outwards, for instance through the pressure of a hydraulic fluid that is pressed through a conduit 6 in the main body of the chuck into a chamber 8. Once the center pin has been extended outwards it is seized along the surface 10 indicated by a thick line by the jaws of the chuck which move in the usual way, i.e. radially in the direction of the double arrow R.

The center pin 3 is thereby centered with a precision which is practically equal to that of the jaws 2 of the chuck, independently of the play of the center pin in the journal which maintains it in a way that allows an axial movement within the body 1 of the chuck. The center pin 3 is journalled in two so-called expanding sleeves 5, 5' which can be expanded in order to immobilize the center pin. Such expanding sleeves are available in the trade and comprise an annular chamber with a thin cylindrical inner wall the radially inward surface of which forms a friction bearing for the center pin. When this chamber is filled (through a conduit that is not shown) with a pressurized fluid its thin inner wall deforms slightly radially inward and seizes the centering pin, i.e. it suppresses the play necessary for the axial movement of the center pin. The invention thus allows the center pin 3 to be fixed in a precisely centered position and to free it again with the least possible play.

When the center pin is extended it maintains the workpiece so that the surface S near its left-hand end (which can for instance be the end bearing of a crankshaft) sufficiently faraway from the chuck and its jaws to be easily accessed by the machining tools. In this position the surface S can therefore be machined with the high precision rendered possible by a machining between centers.

The necessary rotation of the workpiece can for instance be obtained by a driving dog 12, represented in the upper section of the drawing in the form of a broken pin, which transmits (in a way not shown) the rotation of the chuck from one jaw of the same to the workpiece. Machining between centers can, however, also be performed with an immobile chuck and pin, the rotation of the workpiece being then obtained in a known way (not represented) i.e. through a transmission by belt or some other means.

Thereafter the jaw 2 is released and the center pin retracted, which can be achieved in different ways, for instances, through the pressure of a hydraulic fluid pressed through a conduit 7 into a chamber 9, but also through the axial pressure directed towards the left and indicated in the FIGURE by the arrow D exerted by the workpiece 4 against the pressure of this fluid. One can then safeguard the seating of the workpiece 4 on the center pin 3 in the following way during its displacement: the force which pushed the center pin towards the right during the previous machining operation (here the hydraulic pressure in the chamber 8) is not suppressed entirely, but only reduced in a way which at all instants ensures a reliable support of the workpiece 4 through the center pin. One then needs no additional means for supporting the workpiece during the transition from one machining operation to the next. When machining on a twin-head machine-tool, where the other extremity (not shown) of the workpiece is supported in an essentially similar, but symmetrical way by a second head of the machine-tool it is for instance possible to synchronize the movements of both chucks and center pins in a way which ensures that the mounted workpiece is reliably maintained through the pressure of the center pins and/or the grip of the chucks of both machine heads during the passage from one machining operation to the next.

As represented in the lower half of the FIGURE, once the center pin 3 has been retracted into the depths of the chuck 1 the workpiece can be displaced sufficiently far to the left to ensure that is surface S which has been previously machined between centers lies between the jaws 2 of the chuck. The jaws are then closed in the usual way in order to seize the surface S at the location 11 indicated by a thick line, thus adequately maintaining the workpiece 4 for machining operations either on a more distant surface T, or on some excentric surface situated further away (not shown).

Contrary to a support between centers such a clamping in a chuck can be sufficiently robust and maintain a sufficiently precise angular orientation for machining eccentric parts of the workpiece, such as connecting rods bearings on a crankshaft.

In the position shown in the lower part of the FIGURE the pressure of the center pin 3 towards the right on the workpiece 4 is entirely suppressed, as evidence by the small gap between both parts. However, this pressure may also be simply maintained low enough to be irrelevant for the positioning of the workpiece; in both cases the workpiece is centered exclusively through the action of jaw 2 and the other jaws (not shown) of the chuck. Therefore, when retracted, the center pin 3 needs not rotate in a way that is centered with absolute precision, which noticeably reduces the complexity of its bearings.

It is note worthy that although one and the same part of the jaws can be used both for seizing the center pin and the workpiece, the preferred embodiment described here uses different parts of the jaws for these two purposes, to wit: part 10 of the jaws serves to clamp the center pin 3 and part 11 of the jaws serves to clamp the workpiece 4. This separation allows an optimal adaptation of the diameter, and possibly of the shape and/or the type of the corresponding surfaces, of the jaws to the intended purpose. This freedom of choice in particular allows to avoid damaging the surface S, even when one must transmit a comparatively large torque of for instance 100 N·m, such as is for instance needed for grinding.

While there are shown and described presently preferred embodiments of the invention, it is to be distinctly understood that the invention is not limited thereto but may be otherwise variously embodied and practiced within the scope of the following claims.

What is claimed is:

1. Chuck for machining a workpiece in a machine-tool with a tail stock which comprises a center pin journalled centrally in the chuck and displaceable along its rotation axis so that in its foremost position the center pin lies within the gripping space of the chuck and that in its rearmost position the center pin lies outside said space, characterized in that the center pin is journalled in at least one expanding sleeve bearing.

2. Chuck according to claim 1, characterized in that within a first axial interval its jaws are shaped for seizing the center pin and that within a second axial interval, differing from the first, its jaws are shaped for seizing the workpiece.

3. Chuck for machining a workpiece in a twin-head machine tool, where each head comprises a chuck and a center pin journalled centrally in the chuck and displaceable along its rotation axis so that in its foremost position the center pin lies within the gripping space of the chuck and that in its rearmost position the center pin lies outside said space, characterized in that the center pin is journalled in at least one expanding sleeve bearing.

4. Chuck according to claim 3, characterized in that within a first axial interval its jaws are shaped for seizing the center pin and that within a second axial interval, differing from the first, its jaws are shaped for seizing the workpiece.

5. Chuck according to claim 1, characterized in that the center pin is urged hydraulically along the rotation axis of the chuck.

6. Chuck according to claim 1, characterized in that the center pin is urged pneumatically along the rotation axis of the chuck.

7. Chuck according to claim 2, characterized in that the center pin is urged hydraulically along the rotation axis of the chuck.

8. Chuck according to claim 2, characterized in that the center pin is urged pneumatically along the rotation axis of the chuck.

9. Chuck according to claim 3, characterized in that the center pin is urged hydraulically along the rotation axis of the chuck.

10. Chuck according to claim 3, characterized in that the center pin is urged pneumatically along the rotation axis of the chuck.

11. Chuck according to claim 4, characterized in that the center pin is urged hydraulically along the rotation axis of the chuck.

12. Chuck according to claim 4, characterized in that the center pin is urged pneumatically along the rotation axis of the chuck.

* * * * *